United States Patent [19]

Toyonaga et al.

[11] Patent Number: 5,561,525
[45] Date of Patent: Oct. 1, 1996

[54] INTERFEROMETER FOR OBSERVING THE INTERFERENCE PATTERN OF A SURFACE UNDER TEST UTILIZING AN ADJUSTABLE APERTURE STOP

[75] Inventors: Shuji Toyonaga, Kawasaki; Takashi Gemma, Tokyo, both of Japan

[73] Assignee: Nikon Corporation, Tokyo, Japan

[21] Appl. No.: 575,442

[22] Filed: Dec. 20, 1995

Related U.S. Application Data

[63] Continuation of Ser. No. 262,186, Jun. 20, 1994, abandoned.

[30] Foreign Application Priority Data

Jun. 21, 1993 [JP] Japan ................................. 5-172084

[51] Int. Cl.$^6$ ....................................................... G11B 9/02
[52] U.S. Cl. .......................... 356/360; 356/345; 356/351
[58] Field of Search ................................... 356/345, 351, 356/359, 360

[56] References Cited

U.S. PATENT DOCUMENTS

| | | | |
|---|---|---|---|
| 3,930,732 | 1/1976 | Holly | 356/351 |
| 4,537,473 | 8/1985 | Mascameyer | 356/359 |
| 4,594,003 | 6/1986 | Sommargren | 356/359 |
| 4,696,572 | 9/1987 | Ono | 356/360 |
| 4,732,483 | 3/1988 | Biegen | 356/351 |
| 4,791,584 | 12/1988 | Greivenkamp, Jr. | 356/360 |
| 4,869,593 | 9/1989 | Biegen | 356/351 |
| 4,872,755 | 10/1989 | Kuchel | 356/360 |
| 5,039,223 | 8/1991 | Gemma et al. | 356/360 |
| 5,054,924 | 10/1991 | Hochberg | 356/359 |
| 5,054,925 | 10/1991 | Hunter | 356/360 |
| 5,127,734 | 7/1992 | Ohi et al. | 356/359 |
| 5,210,591 | 5/1993 | DeGroot | 356/359 |
| 5,298,971 | 3/1994 | Huang et al. | 356/360 |

OTHER PUBLICATIONS

Ealing Electro–Optics Product Guide, pp. 297–300, 1987/1988 Product Guide.

*Primary Examiner*—Samuel A. Turner
*Assistant Examiner*—Robert Kim
*Attorney, Agent, or Firm*—Keck, Mahin & Cate

[57] ABSTRACT

An interferometer is used for observing the shape of a surface to be detected with the desired spatial resolution. A variable aperture stop is arranged at a Fourier transform image plane of the surface to be detected within an imaging optical system for forming an interference pattern of a reference light and a measuring light. The aperture diameter of the variable aperture stop is adjusted by a control in accordance with the desired spatial resolution.

28 Claims, 3 Drawing Sheets

INTERFEROMETER FOR OBSERVING THE INTERFERENCE PATTERN OF A SURFACE UNDER TEST UTILIZING AN ADJUSTABLE APERTURE STOP

This is a continuation of Ser. No. 08/262,186, filed on Jun. 20, 1994, abandoned.

BACKGROUND OF THE INVENTION

1. Field of the Invention

The present invention relates to an interferometer which is used, for example, in the highly accurate measurement of the shape of a surface to be detected.

2. Description of Related Art

The shape measurement of a surface to be detected by the use of the light interference method has been widely used as an extremely highly accurate measuring technique. In the past, interferometers of the type utilizing two light beams, e.g., those called as the Twyman-Green type and the Fizeau type have been used as the conventional apparatus for making the measurement of such kind. All of these types of interferometers are so degined that the light beam from a light source is divided into two light beams including a measuring light and a reference light and, after providing the proper optical path difference (phase difference) between the light beams, the light beams are combined to interfere with each other. When measuring the shape of a surface to be detected, one of the divided two light beams is reflected as a measuring light from the surface so that the reflected light, which is diffracted in response to the irregularities of the surface, is imaged on an observation surface through an imaging lens and this reflected light is interfered with the other light beams (a reference light) reflected from a reference surface, thereby observing the interference fringes produced in accordance with the irregularities of the surface to be detected.

Usually, in the Twyman-Green interferometer the reference surface and the surface to be detected are arranged on the different optical paths so that the two light beams or the measuring light and the reference light are separated into the different optical paths and then they are again combined, thereby causing an interference. On the other hand, in the Fizeau interferometer a surface to be detected and a semi-transparent reference surface are arranged on the same optical path.

With such interferometer of the type utilizing two light beams, the resolution of the surface irregularities observed on the basis of the interference fringes is determined by the angular aperture of an imaging lens and the finer interference fringes can be observed with an increase in the angular aperture. This angular aperture is determined by the diameter of an aperture stop arranged at the Fourier transform image plane of the surface to be detected.

With such above-mentioned conventional interferometer, however, the aperture stop diameter of the imaging lens is fixed as such and the resolution of the observable irregularities of the surface to be detected is constant. Thus, where it is desirable to observe such surface irregularities with various spatial resolutions freely there is the disadvantage of being unable to meet the requirement.

SUMMARY OF THE INVENTION

It is the primary object of the present invention to provide an interferometer capable of observing the irregularities or shape of a surface to be detected with an arbitrary spatial resolution.

In accordance with an aspect of the present invention, there is thus provided an interferometer including a light source, an imaging optical system, a beam splitter for directing a light beam from the light source to a surface to be detected and a reference surface and for directing the reflected light from the surface to be detected and the reference surface to the imaging optical system, and a detecting optical system for observing the interference pattern formed through the imaging optical system. In this case, the imaging optical system includes an imaging lens, a variable aperture stop arranged at the Fourier transform image plane of the surface to be detected and stop control means for varying the aperture diameter of the variable aperture stop.

Also, in accordance with another aspect of the present invention, the imaging optical system includes a double side telecentric optical system.

With the interferometer according to the first aspect of the present invention, the Fourier transform image plane of the surface to be detected is formed within the imaging optical system and the aperture stop is arranged at this Fourier transform image plane in such a manner that the aperture diameter of the aperture stop is variably controlled by the stop control means.

In this case, the imaging system is a coherent system and therefore the cut-off spatial frequency $v_i$ of an image formed on the observation surface by the imaging lens is given in accordance with the image-side numerical aperture N.A. of the imaging lens and the wavelength $\lambda$ of a laser light beam as shown by the following equation $$v_i = N.A./\lambda$$

In other words, with this interferometer, the spatial resolution becomes a frequency $v_m = \beta_i [* v_i$ obtained by multiplying the cut-off spatial frequency $v_i$ by the magnification $\beta_i$ of the imaging lens and it is possible to observe the shape, e.g., the irregularities of the surface to be detected which are up to the frequency $v_m$.

Therefore, assuming that the diameter of the aperture stop of the imaging lens is represented as $\phi$, the numerical aperture N.A. is given by the following equation $$N.A. = k\phi$$

here, $\underline{k}$ is a constant which is determined by the characteristics of the imaging lens.

Therefore, the cut-off spatial frequency (resolution) of the observable irregularities of the surface to be detected is given as follows:

$$v_m = k * |\beta_i| * \phi/\lambda$$

As shown by this equation, the spatial resolution $v_m$ of the interferometer is determined by the diameter $\phi$ of the aperture stop. Thus, since the aperture diameter of the aperture stop is variable in this invention, the aperture diameter $\phi$ can be varied to measure the shape of the surface with the desired resolution $v_m$.

Also, with the interferometer, generally there are cases where a compernsation is provided by utilizing the measured data of a prototype as an aberration compensation method. In other words, prototype which has been preliminarily tested to be extremely high in accuracy is measured by the interferometer so that on the assumption that the result obtained indicates the inherent error of the interferometer, the distribution of this measured data is subtracted from the measured data of a surface to be detected, thereby eliminating the effect of the error of the interferometer.

Where the position of the prototype and the position of the surface to be detected are different, however, the focusing is performed again so that if the size of the image is varied, it is impossible to provide a correct compensation.

Therefore, in accordance with another preferred aspect of the present invention the imaging lens is formed by a double side telecentric optical system. By so doing, the size of an image is not varied by the focusing and thus the accuracy is improved when subjecting the interferometer to aberration compensation by using the measured data of the prototype.

DESCRIPTION OF THE PREFERRED EMBODIMENTS

Figure 1:
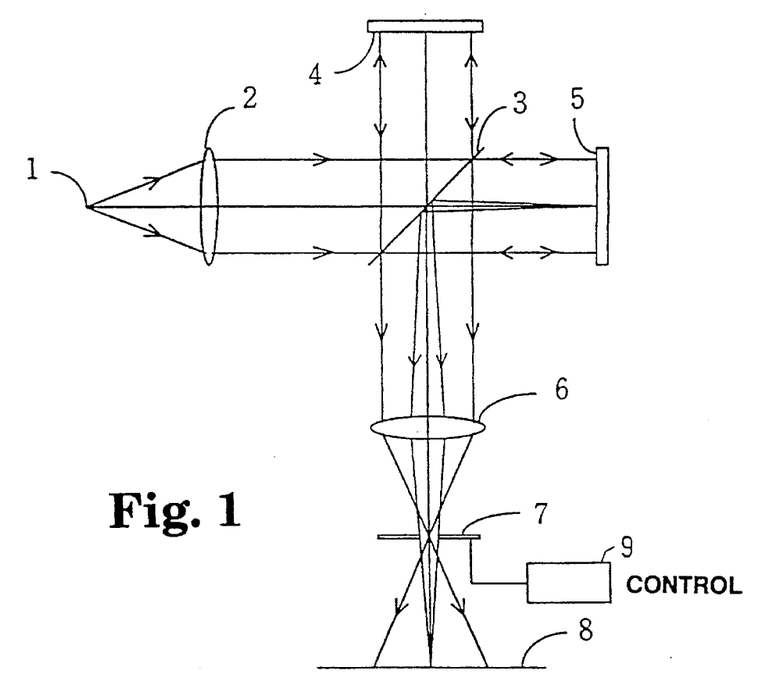
FIG. 1 shows schematically the construction of a Twyman-Green interferometer constituting a first embodiment of the present invention.

Referring to FIG. 1, there is illustrated schematically the construction of a Twyman-Green interferometer constituting a first embodiment of the present invention. In the Figure, the light emitted from a semi-monochromatic light source 1 is converted to a collimated light beam by a collimator lens 2 and it falls on a semitransparent reflecting mirror 3.

Of the incident light on the semitransparent reflecting mirror 3, the light reflected by the semitransparent reflecting mirror 3 is directed to vertically fall as a reference light on a reference surface 4 and the light transmitted through the semitransparent reflecting mirror 3 is directed as a measuring light to fall vertically on a surface 5 to be detected.

The measuring light incident on the surface 5 is reflected and diffracted by the irregularities of the surface 5 and this reflection-diffracted light is again reflected by the semitransparent reflecting mirror 3 and directed to an imaging optical system 6. On the other hand, the reference light incident on the reference surface 4 is reflected by it, transmitted further through the semitransparent reflecting mirror 3 and directed to the imaging optical system 6. The reflection-diffracted light of the measuring light and the reference light are directed to an observation surface 8 through the imaging lens of the imaging optical system 6 and a variable aperture stop 7 arranged at the Fourier transform image plane in the imaging optical system 6 with respect to the surface 5 so that the two lights interfere with each other and an interference pattern corresponding to the irregularities of the surface 5 is formed on the observation surface 8.

In this case, the fineness of the irregularities of the surface 5 which can be observed by means of the interference fringes, is determined by the angular aperture of the imaging optical system 6 which corresponds to the aperture diameter of the aperture stop. In other words, where it is desired to make the observation more finely with a higher spatial resolution, it is only necessary to increase the aperture diameter. In accordance with the present embodiment, the aperture diameter of the variable aperture stop 7 can be adjusted to any desired size by a stop control 9. Thus, it is only necessary to set the aperture diameter by the stop control 9 so as to obtain the spatial resolution of the desired level which is required for the observation of the irregularities of the surface 5.

Figure 2:
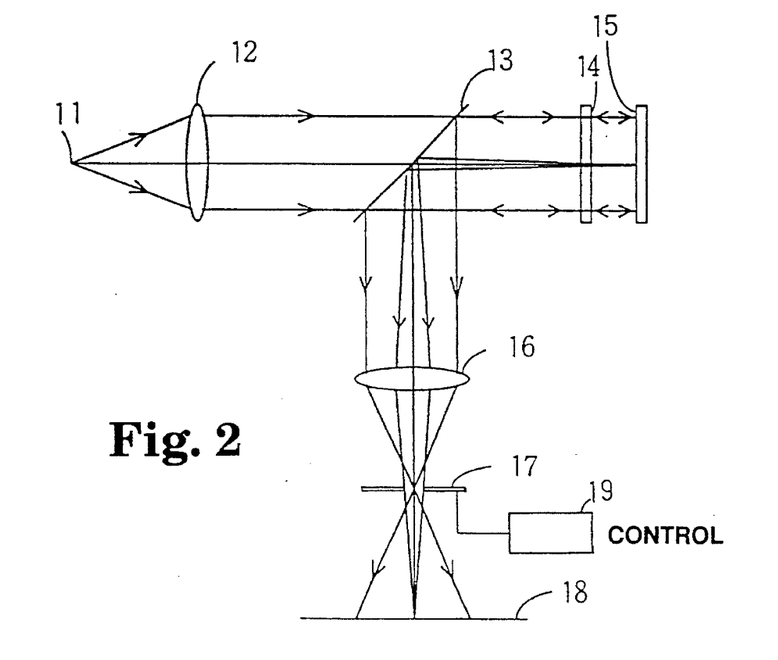
FIG. 2 shows schematically the construction of a Fizeau interferometer according to the second embodiment of the present invention.

Referring now to FIG. 2, there is illustrated schematically the construction of a Fizeau interferometer constituting a second embodiment of the present invention. In the Figure, the light emitted from a semi-monochromatic light source 11 is converted to a collimated light beam by a collimator lens 12 and then the light falls on a semitransparent reflecting mirror 13. The light transmitted through the semitransparent reflecting mirror 13 falls on a semitransparent reference surface 14 so that a part of the incident light is reflected as a reference light by the semitransparent reference surface 14 and the other part is transmitted as a measuring light through the semitransparent reference surface 14.

The reference light reflected by the semitransparent reference surface 14 again falls on the semitransparent reflecting mirror 13 so that it is reflected by the semitransparent reflecting mirror 13 and directed to an imaging optical system 16.

On the other hand, the measuring light transmitted through the semitransparent reference surface 14 falls vertically on a surface 15 to be detected and it is reflected and diffracted by the irregularities of the surface 15. The reflection-diffracted light is again transmitted through the semitransparent reference surface 14 to fall on the semitransparent reflecting mirror 13 so that it is reflected by the semitransparent reflecting mirror 13 and directed to the imaging optical system 16.

The reflection-diffracted light of the measuring light and the reference light are directed onto an observation surface 18 through the imaging lens of the imaging optical system 16 and a variable aperture stop 17 arranged at the Fourier transform image plane in the imaging optical system 16 with respect to the surface 15 and the two lights interfere with each other on the observation surface 18, thereby forming on the observation surface 18 an interference pattern corresponding to the irregularities of the surface 15.

In accordance with the present embodiment, it is also possible to adjust the variable aperture stop 17 to an arbitrary aperture diameter by a stop control 19 in the like manner as the interferometer shown in FIG. 1. Therefore, it is only necessary to set the aperture diameter by the stop control 19 so as to obtain the spatial resolution of the desired level which is required for the observation of the irregularities of the surface 15.

Figure 3:
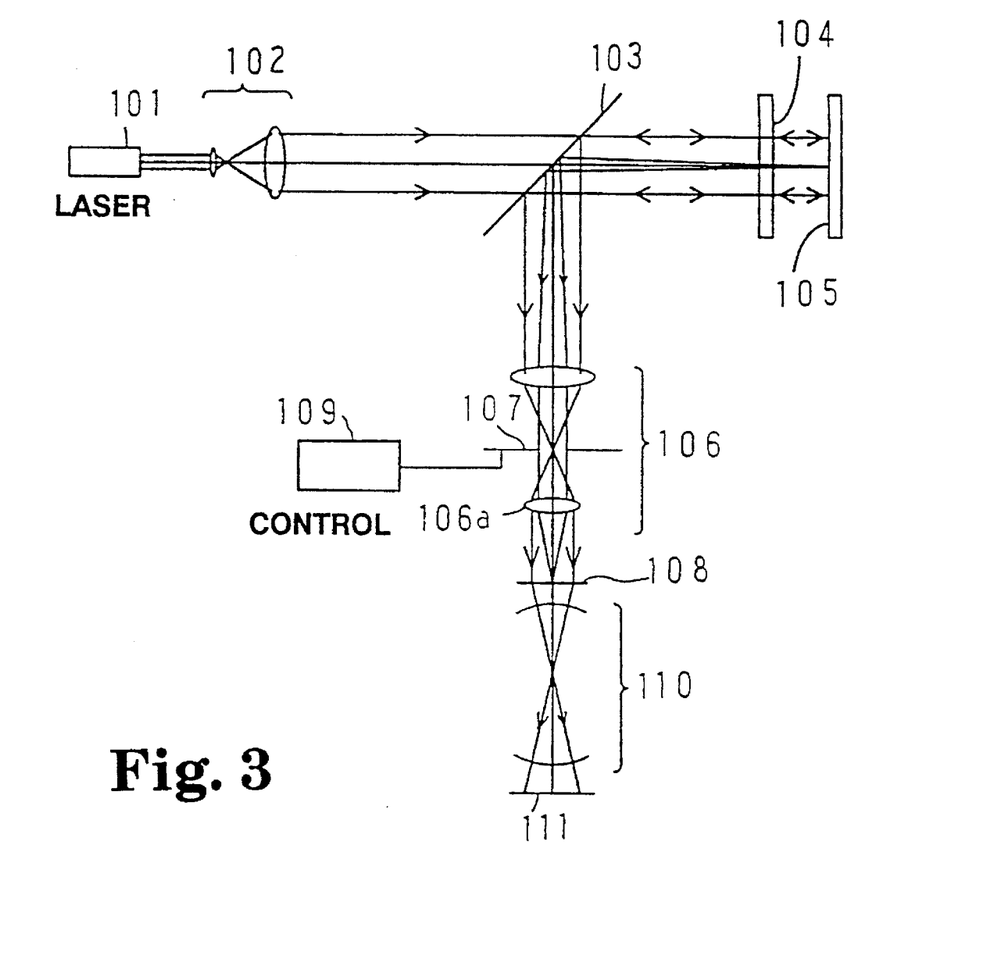
FIG. 3 shows schematically the construction of a Fizeau interferometer according to a third embodiment of the present invention.

Referring now to FIG. 3, there is illustrated a Fizeau interferometer constituting a third embodiment of the present invention. With the interferometer of this embodiment, an imaging optical system includes a telecentric optical system and a detecting optical system is constructed so that an interference pattern of a surface to be detected is observed by a CCD camera through a zoom lens.

In FIG. 3, the light emitted from a laser light source 101 is converted to a parallel light beam of a suitable diameter by a beam expander 102 and then it falls on a semitransparent reflecting mirror 103. Of the light which has been transmitted through the semitransparent reflecting mirror 103 and has fallen on a semitransparent reference surface 104, the light reflected from the reference surface 104 again falls as a reference light on the semitransparent reflecting mirror 103 so that is reflected by the semitransparent reflecting mirror 103 and directed to an imaging optical system 106.

On the other hand, the light transmitted through the semitransparent reference surface 104 vertically falls as a measuring light on a surface 105 to be detected and the light is reflected and diffracted by the irregularities of the surface 105. This reflection-diffracted light is again transmitted through the semitransparent reference surface 104 to fall on the semitransparent reflecting mirror 103 so that it is reflected by the mirror 103 and directed to the imaging optical system 106. The reflection-diffracted light of the measuring light and the reference light are directed onto an observation surface 108 through the two group-construction imaging lens of the imaging optical system 106 and a variable aperture stop 107 arranged at the Fourier transform image plane of the imaging optical system 106 with respect to the surface 105 so that the two lights interfere with each other on the observation surface 108 and an interference pattern corresponding to the irregularities of the surface 105 is formed on the observation surface 108.

In this case, the imaging lens of the imaging optical system 106 includes a double side telecentric optical system composed to two-group lenses which move as a unit along the optical axis. Thus, even if the focusing is effected each time a different surface to be detected is measured, the size of the image is not varied and the desired aberration compensation can be provided accurately by the use of a single prototype as mentioned previously.

Also, as with the first and second embodiments, in accordance with the third embodiment the variable aperture stop 107 can be adjusted to an arbitrary aperture diameter by a stop control 109 and therefore the aperture diameter can be set by the stop control 109 so as to obtain the spatial resolution of the desired level which is required for the observation of the irregularities of the surface 105.

However, as shown in FIG. 3, the third embodiment is constructed so that an interference image formed on the observation surface 108 is observed by a CCD camera 111 through a zoom lens 110 and therefore it is necessary to consider the magnification (represented by $\beta_z$) of the zoom lens 110 and the limitation to the spatial resolution due to the CCD.

Firstly, also in this case, the imaging system is a coherent system and thus the cut-off spatial frequency $v_i$ of an image formed on the observation surface by the imaging optical system 106 is given by the following equation in accordance with the image-side numerical aperture N.A. of the imaging optical system 106 and the wavelength $\lambda$ of the laser beam $$v_i = N.A./\lambda$$

In other words, the spatial resolution of the imaging system of this interferometer becomes a frequency $v_m = \beta_i \text{semitransparent} v_i$ as obtained by multiplying the frequency $v_i$ by the magnification $\beta_i$ of the imaging optical system 106 and it is possible to form an image of the shape, e.g., the irregularities of the surface 105 on the observation surface.

Therefore, if the diameter of the variable aperture stop 107 is represented by $\phi$ and the image-side focal length of the imaging lens 106a is represented by f, the N.A. is given by the following equation $$N.A. = \phi/2f$$

Therefore, the cut-off spatial frequency $v_m$ of the observable irregularities of the surface 105 becomes as follows $$v_m = |\beta_i| * \phi/2f\lambda$$

Assuming now that the picture element pitch of the CCD camera 111 is represented by $p_c$, a cut-off spatial frequency $v_i'$ that can be resolved on the observation surface 108 by the CCD camera 111 is given by the following equation $$v_i' = |\beta_z|/2p_c$$

In this case, in order to always obtain the maximum spatial resolution with respect to the magnification $\beta_z$ of the zoom lens 110, it is necessary that the cut-off spatial frequency $v_i$ of the imaging optical system 106 on the observation surface must coincide with the cut-off spatial frequency $v_i'$ that can be resolved by the CCD, that is, $v_i = v_i'$ must be ensured.

Therefore, the relation between the magnification $\beta_z$ of the zoom lens 110 and the aperture stop diameter $\phi$ is given by the following equation $$\phi = f * \lambda * |\beta_z|/p_c$$

In other words, by adjusting the aperture diameter $\phi$ of the variable aperture stop 107 by the stop control 109 in conformity with the magnification $\beta_z$ of the zoom lens 110 so as to satisfy the above equation, it is possible to always observe the shape of the surface 105 with the maximum spatial resolution.

Also, when it is desired to observe the irregularities of the surface with various spatial resolutions or with any specified spatial resolution in a condition where the magnification $\beta_z$ of the zoom lens 110 is maintained constant or the visual field of the observation surface is held constant, it is only necessary to select the aperture diameter $\phi$ of the variable aperture stop 107 to come within the following range $$\phi \leq f\lambda \ |\beta_z|/p_c$$

Figure 4:
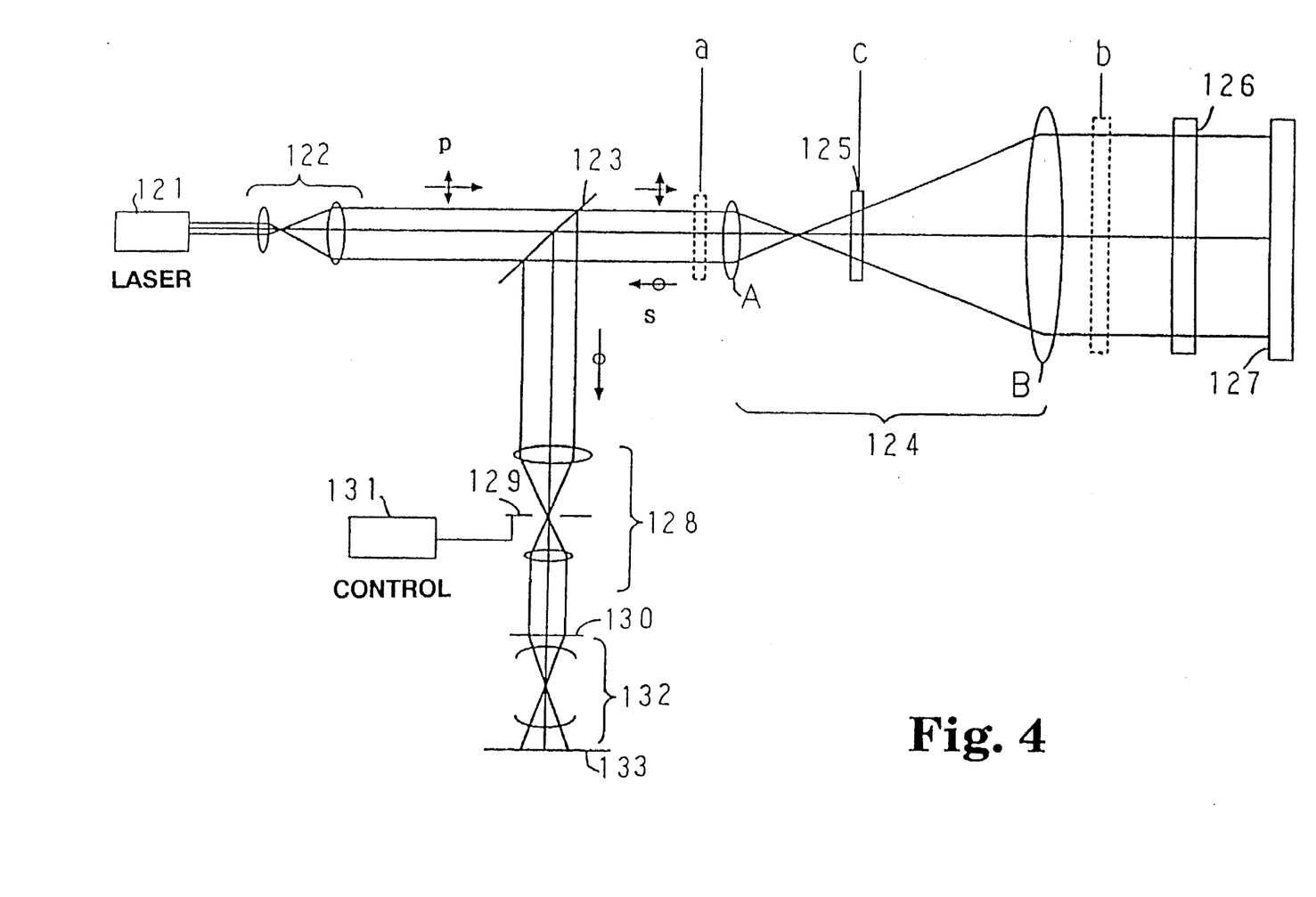
FIG. 4 shows schematically the construction of a Fizeau interferometer according to a fourth embodiment of the present invention.

Referring to FIG. 4, there is illustrated a Fizeau interferometer constituting a fourth embodiment of the present invention. This embodiment is suited for the observation of a comparatively large-sized surface 127 to be detected by the Fizeau interferometer.

In FIG. 4, the light emitted from a laser light source 121 is converted to a parallel light beam of a suitable diameter by a beam expander 122 and then it falls on a polarizing beam splitter 123. Of the incident light on the polarizing beam splitter 123, the P-polarized component is transmitted through the polarizing beam splitter 123, expanded to a beam diameter corresponding to the surface 127 by a beam expander 124 and then transmitted through a quarter-wave plate 125 to fall on a semitransparent reference surface 126.

A part of the incident light is reflected as a reference light by the semitransparent reference surface 126 so that the reference light is again transmitted in the reverse direction through the beam expander 124 and the quarter-wave plate and becomes an S-polarized light. The S-polarized reference light is reflected by the polarizing beam splitter 123 and directed to an imaging optical system 128.

On the other hand, the other part of the incident light on the semitransparent reference surface 126 from the beam expander 124 is transmitted through the semitransparent reference surface 126 and directed vertically as a measuring light to the surface 127. This measuring light is reflected and diffracted by the surface 127 so that this reflection-diffracted light is transmitted in the reverse direction through the beam expander 124 and the quarter-wave plate and converted to an S-polarized light. This S-polarized measuring light is reflected by the polarizing beam splitter 123 and directed to the imaging optical system 128.

These S-polarized reference light and measuring light are directed onto an observation surface 130 through the two group-construction imaging lens of the imaging optical system 128, which forms a double side telecentric optical system, and a variable aperture stop 129 arranged at the Fourier transform image plane in the imaging optical system 128 with respect to the surface 127, so that the two lights interfere with each other on the observation surface 130 and an interference pattern corresponding to the irregularities of the surface 127 is formed on the observation surface 130. The interference fringes produced on the observation surface 130 are further observed by a CCD camera 133 through a zoom lens 132.

As in the case of the third embodiment, in this embodiment the aperture diameter of the variable aperture stop 129 is set by a stop control 131 while considering the magnification of a zoom lens 132, the limitation to the resolution of the CCD photosensitive surface, etc.

It is to be noted that while, in this embodiment, the quarter wave plate 125 is arranged at the position C in the optical path of the beam expander 124, it is readily understandable to those skilled in the art that this arrangement is no more than a mere example and there is no reason to prevent the use of any other modified arrangement. For instance, if consideration is given to the possibility of causing noise by the reflected light from the lens surface of each of the lenses A and B forming the beam expander 124, it is most desirable to arrange the quarter-wave plate at the position b shown in the optical path of FIG. 4. The reason is that if the quarter-wave plate is arranged at the position b, the quarter-wave plate has no bearing on the reflected light from the lens surfaces of the lenses A and B so that the reflected light, in the form of P-polarized light, are transmitted as such through the polarizing beam splitter 123 in the direction tending to return to the light source and these reflected lights are not directed as noise to the imaging optical system 128. Where the quarter-wave plate is arranged at the position b, however, it is necessary to use the wave plate having a large aperture diameter corresponding to the light beam diameter expanded by the beam expander and therefore there is the possibility of causing other problems from the manufacturing and cost standpoints of the wave plate.

On the other hand, if the quarter-wave plate is arranged at the position a shown in FIG. 4, the diameter of the quarter-wave plate can be advantageously reduced to a relatively small value and this is a meritorious arrangement structurally. If the quarter-wave plate is arranged at the position a, however, when the reflected light from the lens surfaces of the lenses A and B are transmitted through this wave plate, the reflected light become S-polarized light so that these S-polarized lights are reflected by the polarizing beam splitter 123 and directed to the imaging optical system 128. Therefore, where the surface 127 is observed by using a high spatial resolution and increasing the aperture diameter of the variable aperture stop 129, there is the danger of the S-polarized light of the previously mentioned reflected light passing through the aperture stop 129 and resulting in a large amount of noise.

In view of these reasons, it is appropriate that the quarter-wave plate is arranged in the optical path between the lenses A and B forming the beam expander 124 as in the fourth embodiment. In this case, the reflected light from the surface of the lens B is converted to an S-polarized light by passing through the quarter-wave plate so that it is reflected by the beam splitter 123 and directed to the imaging optical system 128. It is to be noted that, in this case, the diameter of the lens B is so large that, of the reflected light from this lens surface, the amount of the S-polarized light passing through the aperture stop 129 is in effect so small as to be ignored. Also, in this case, as regards the reflection of the light from the quarter-wave plate itself, it is more advantageous to insert the quarter-wave plate at a position closer to the lens B side than the focal position within the beam expander 124. The reason for this resides in that there is the effect of diverging the light reflected from the surface of the lens B and noise reducing its effect. It is needless to say that the application of a reflection reducing film to the wave plate surface is desirable. Also, it is a matter of course that the use of a wave plate having a thickness of as small as possible is more effective.

What is claimed is:

1. An interferometer comprising:

a light source for producing a light beam of a predetermined wavelength;

a beam splitter for directing the light beam from said light source to a surface to be detected and a reference surface wherein reflected light from said surface to be detected and said reference surface are combined to form combined reflected light on the same optical axis;

an imaging optical system for forming an interference pattern of said combined reflected light;

a detecting optical system for observing said interference pattern formed by said imaging optical system;

a variable aperture stop arranged at a Fourier transform image plane of said surface to be detected within said imaging optical system; and stop control means for varying an aperture diameter of said variable aperture stop to adjust a spatial resolution of said interferometer in order to detect irregularities on said surface with a desired value of spatial resolution, wherein said stop control means adjusts an aperture diameter φ of said variable aperture stop so as to satisfy the following equation $v_m = |\beta_i| * \phi / 2f\lambda$ where $v_m$ is said desired value of spatial resolution, $\beta_i$ is a magnification of said imaging optical system, f is the image-side focal length of said imaging optical system, and λ is the wavelength of the light beam.

2. An interferometer according to claim 1, further comprising a beam expander for expanding a diameter of the light beam from said light source in accordance with an area of an observation region of said surface to be detected.

3. An interferometer comprising:

a light source for producing a light beam of a predetermined wavelength;

a beam splitter for directing the light beam from said light source to a surface to be detected and a reference surface wherein reflected light from said surface to be detected and said reference surface are combined to form combined reflected light on the same optical axis;

an imaging optical system for forming an interference pattern of said combined reflected light;

a detecting optical system for observing said interference pattern formed by said imaging optical system;

a variable aperture stop arranged at a Fourier transform image plane of said surface to be detected within said imaging optical system;

stop control means for varying an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control means adjusts an aperture diameter φ of said variable aperture stop in conformity with a picture element pitch of the CCD camera so as to satisfy the following equation $$\phi = f\lambda \, |\beta_z|/p_c$$

wherein $\beta_z$ is a magnification of said zoom lens system, $\underline{f}$ is the image-side focal length of the imaging optical system, $\lambda$ is the wavelength of the light beam, and $p_c$ is the picture element pitch of the CCD camera.

4. An interferometer comprising:
   a light source for producing a light beam of a predetermined wavelength;
   a beam splitter for directing the light beam from said light source to a surface to be detected and a reference surface wherein reflected light from said surface to be detected and said reference surface are combined to form combined reflected light on the same optical axis;
   an imaging optical system for forming an interference pattern of said combined reflected light;
   a detecting optical system for observing said interference pattern formed by said imaging optical system;
   a variable aperture stop arranged at a Fourier transform image plane of said surface to be detected within said imaging optical system;
   stop control means for varying an aperture diameter of said variable aperture stop to adjust a spatial resolution of said interferometer in order to detect said surface with a desired value of spatial resolution;
   said detecting optical system including a zoom lens system for varying a magnification of said interference pattern formed by said imaging optical system; and
   a CCD camera for picking up said interference pattern varied in magnification by said zoom lens system, wherein said stop control means adjusts an aperture diameter φ of said variable aperture stop in accordance with a picture element pitch of the CCD camera so as to satisfy the following equation $$\phi \leq f\lambda \, |\beta_z|/p_c$$

wherein $\beta_z$ is a magnification of said zoom lens system, $\underline{f}$ is the image-side focal length of the imaging optical system, $\lambda$ is the wavelength of the light beam, and $p_c$ is the picture element pitch of the CCD camera.

5. A Twyman-Green interferometer comprising:
   a light source for producing light of a predetermined wavelength;
   an optical system wherein the light emitted from said light source is converted to a substantially parallel light beam directed in a first direction;
   a beam splitter for transmitting said parallel light beam in said first direction and reflecting said parallel light beam in a second direction perpendicular to said first direction thereby separating said parallel light beam into two light beams of a transmitted light and a reflected light of the directions perpendicular to each other;
   a surface to be detected for substantially vertically receiving irradiation of said transmitted light to produce a reflection-diffracted light wherein said reflection-diffracted light is reflected by said beam splitter to travel in a third direction which is opposite to said second direction;
   a reference surface arranged to substantially vertically receive irradiation of said reflected light to produce a reference reflected light wherein said reference reflected light is transmitted through said beam splitter, combined with said reflection-diffracted light and directed in said third direction;
   an imaging optical system arranged in an optical path directed in said third direction to form an interference pattern of said reflection-diffracted light and said reference reflected light on an observation surface at a predetermined position;
   a variable aperture stop arranged at a Fourier transform image plane in said imaging optical system with respect to said surface to be detected; and
   a stop control for adjusting an aperture diameter of said variable aperture stop to adjust a spatial resolution of said interferometer in order to detect irregularities on said surface with a desired value of spatial resolution, wherein said stop control adjusts an aperture diameter φ of said variable aperture stop so as to satisfy the following equation $$v_m = |\beta_i| * \phi/2f\lambda$$

where $v_m$ is said desired value of spatial resolution, $\beta_i$ is a magnification of said imaging optical system, f is the image-side focal length of said imaging optical system, and $\lambda$ is the wavelength of the light beam.

6. An interferometer according to claim 5, further comprising a beam expander for expanding a diameter of said light from said light source in accordance with an area of an observation region of said surface to be detected.

7. A Twyman-Green interferometer comprising:
   a light source for producing light of a predetermined wavelength;
   an optical system wherein the light emitted from said light source is converted to a substantially parallel light beam directed in a first direction;
   a beam splitter for transmitting said parallel light beam in said first direction and reflecting said parallel light beam in a second direction perpendicular to said first direction thereby separating said parallel light beam into two light beams of a transmitted light and a reflected light of the directions perpendicular to each other;
   a surface to be detected for substantially vertically receiving irradiation of said transmitted light to produce a reflection-diffracted light wherein said reflection-diffracted light is reflected by said beam splitter to travel in a third direction which is opposite to said second direction;
   a reference surface arranged to substantially vertically receive irradiation of said reflected light to produce a reference reflected light wherein said reference reflected light is transmitted through said beam splitter, combined with said reflection-diffracted light and directed in said third direction;
   an imaging optical system arranged in an optical path directed in said third direction to form an interference pattern of said reflection-diffracted light and said reference reflected light on an observation surface at a predetermined position;
   a variable aperture stop arranged at a Fourier transform image plane in said imaging optical system with respect to said surface to be detected;
   a stop control for adjusting an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control adjusts an aperture diameter φ of said variable aperture stop in conformity with a picture element pitch of the CCD camera so as to satisfy the following equation $$\phi = f\lambda \, |\beta_z|/p_c$$

wherein $\beta_z$ is a magnification of said zoom lens system, $f$ is the image-side focal length of the imaging optical system, $\lambda$ is the wavelength of the light beam, and $p_c$ is the picture element pitch of the CCD camera.

8. A Twyman-Green interferometer comprising:

a light source for producing light of a predetermined wavelength;

an optical system wherein the light emitted from said light source is converted to a substantially parallel light beam directed in a first direction;

a beam splitter for transmitting said parallel light beam in said first direction and reflecting said parallel light beam in a second direction perpendicular to said first direction thereby separating said parallel light beam into two light beams of a transmitted light and a reflected light of the directions perpendicular to each other;

a surface to be detected for substantially vertically receiving irradiation of said transmitted light to produce a reflection-diffracted light wherein said reflection-diffracted light is reflected by said beam splitter to travel in a third direction which is opposite to said second direction;

a reference surface arranged to substantially vertically receive irradiation of said reflected light to produce a reference reflected light wherein said reference reflected light is transmitted through said beam splitter, combined with said reflection-diffracted light and directed in said third direction;

an imaging optical system arranged in an optical path directed in said third direction to form an interference pattern of said reflection-diffracted light and said reference reflected light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control adjusts an aperture diameter φ of said variable aperture stop in accordance with a picture element pitch of the CCD camera so as to satisfy the following equation $$\phi \leq f\lambda \, |\beta_z|/p_c$$

wherein $\beta_z$ is a magnification of said zoom lens system, $f$ is the image-side focal length of the imaging optical system, $\lambda$ is the wavelength of the light beam, and $p_c$ is the picture element pitch of the CCD camera.

9. A Fizeau interferometer comprising:

a light source for producing light of a predetermined wavelength;

an optical system for converting the light emitted from said light source to a substantially parallel light beam directed in a first direction;

a beam splitter for transmitting said parallel light beam in said first direction and for reflecting an incident light directed in a second direction opposite to said first direction in a third direction perpendicular to said first direction;

a semitransparent reference surface wherein a part of said parallel light beam transmitted through said beam splitter in said first direction is reflected and returned as a reference light in said second direction and the other part of said parallel light beam is transmitted as a measuring light in said first direction, said reference light being reflected by said beam splitter and directed in said third direction;

a surface to be detected arranged so as to substantially vertically receive irradiation of said measuring light transmitted through said semitransparent reference surface in said first direction to produce a reflection-diffracted light, said reflection-diffracted light being transmitted through said semitransparent reference surface in said second direction, reflected by said beam splitter, combined with said reference light and directed in said third direction;

an imaging optical system arranged in an optical path directed in said third direction to form an interference pattern of said reflection-diffracted light and said reference light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect irregularities on said surface with a desired value of spatial resolution, wherein said stop control adjusts an aperture diameter φ of said variable aperture stop so as to satisfy the following equation $$v_m = |\beta_i| * \phi/2f\lambda$$

where $v_m$ is said desired value of spatial resolution, $\beta_i$ is a magnification of said imaging optical system, $f$ is the image-side focal length of said imaging optical system, and $\lambda$ is the wavelength of the light beam.

10. An interferometer according to claim 9, further comprising a beam expander for expanding a diameter of the light beam from said light source in accordance with an area of an observation region of said surface to be detected.

11. A Fizeau interferometer comprising:

a light source for producing light of a predetermined wavelength;

an optical system for converting the light emitted from said light source to a substantially parallel light beam directed in a first direction;

a beam splitter for transmitting said parallel light beam in said first direction and for reflecting an incident light directed in a second direction opposite to said first direction in a third direction perpendicular to said first direction;

a semitransparent reference surface wherein a part of said parallel light beam transmitted through said beam splitter in said first direction is reflected and returned as a reference light in said second direction and the other part of said parallel light beam is transmitted as a measuring light in said first direction, said reference light being reflected by said beam splitter and directed in said third direction;

a surface to be detected arranged so as to substantially vertically receive irradiation of said measuring light transmitted through said semitransparent reference surface in said first direction to produce a reflection-diffracted light, said reflection-diffracted light being transmitted through said semitransparent reference surface in said second direction, reflected by said beam splitter, combined with said reference light and directed in said third direction;

an imaging optical system arranged in an optical path directed in said third direction to form an interference pattern of said reflection-diffracted light and said reference light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control adjusts an aperture diameter $\phi$ of said variable aperture stop in conformity with a picture element pitch of the CCD camera so as to satisfy the following equation $$\phi = f\lambda |\beta_z|/p_c$$

wherein $\beta_z$ is a magnification of said zoom lens system, $\underline{f}$ is the image-side focal length of the imaging optical system, $\lambda$ is the wavelength of the light beam, and $p_c$ is the picture element pitch of the CCD camera.

12. A Fizeau interferometer comprising:

a light source for producing light of a predetermined wavelength;

an optical system for converting the light emitted from said light source to a substantially parallel light beam directed in a first direction;

a beam splitter for transmitting said parallel light beam in said first direction and for reflecting an incident light directed in a second direction opposite to said first direction in a third direction perpendicular to said first direction;

a semitransparent reference surface wherein a part of said parallel light beam transmitted through said beam splitter in said first direction is reflected and returned as a reference light in said second direction and the other part of said parallel light beam is transmitted as a measuring light in said first direction, said reference light being reflected by said beam splitter and directed in said third direction;

a surface to be detected arranged so as to substantially vertically receive irradiation of said measuring light transmitted through said semitransparent reference surface in said first direction to produce a reflection-diffracted light, said reflection-diffracted light being transmitted through said semitransparent reference surface in said second direction, reflected by said beam splitter, combined with said reference light and directed in said third direction;

an imaging optical system arranged in an optical path directed in said third direction to form an interference pattern of said reflection-diffracted light and said reference light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control adjusts an aperture diameter $\phi$ of said variable aperture stop in accordance with a picture element pitch of the CCD camera so as to satisfy the following equation $$\phi \leq f\lambda |\beta_z|/p_c$$

wherein $\beta_z$ is a magnification of said zoom lens system, $\underline{f}$ is the image-side focal length of the imaging optical system, $\lambda$ is the wavelength of the light beam, and $p_c$ is the picture element pitch of the CCD camera.

13. An interferometer comprising:

a laser light source for producing a laser light beam of a predetermined wavelength;

an optical system for converting said laser light beam to a substantially parallel light beam having a predetermined beam diameter and directed in a first direction;

a polarizing beam splitter arranged along an optical path of said parallel light beam directed in said first direction wherein first and second polarized light components are related so that vector vibration directions thereof are perpendicular to each other, only said first polarized light component is transmitted in said first direction and only said second polarized light component, directed in a second direction opposite to said first direction, is reflected in a third direction perpendicular to said first direction;

a semitransparent reference surface wherein a part of the first polarized light component of said parallel light beam transmitted through said polarizing beam splitter in said first direction is returned as a reference light in said second direction and the other part of the first polarized light component is transmitted as a measuring light in said first direction;

a surface to be detected arranged to substantially vertically receive irradiation of said measuring light transmitted through said semitransparent reference surface in said first direction to produce a reflection-diffracted light, said reflection-diffracted light being transmitted through said semitransparent reference surface in said second direction;

a wave plate for converting said reference light and said reflection-diffracted light to second polarized components for introduction into said polarizing beam splitter, said second polarized components being reflected by said polarizing beam splitter, combined with each other and directed in said third direction;

an imaging optical system arranged in an optical path directed in said third direction wherein an interference pattern of said second polarized components of said reflection-diffracted light and said reference light is formed on an observation surface at a predetermined position;

a variable aperture stop arranged at a Fourier transform image plane in said imaging optical system with respect to said surface to be detected;

a stop controller for adjusting an aperture diameter of said variable aperture stop to adjust a spatial resolution of said interferometer in order to detect irregularities on said surface with a desired value of spatial resolution, wherein said stop controller adjusts an aperture diameter $\phi$ of said variable aperture stop so as to satisfy the following equation $$v_m = |\beta_i| * \phi/2f\lambda$$

where $v_m$ is said desired value of spatial resolution, $\beta_i$ is a magnification of said imaging optical system, f is the image-focal length of said imaging optical system, and $\lambda$ is the wavelength of the light beam.

14. An interferometer according to claim 13, further comprising a beam expander arranged between said polarizing beam splitter and said surface to be detected for expanding a beam diameter of said measuring light in accordance with an area of an observation region of said surface to be detected.

15. An interferometer according to claim 14, wherein said wave plate is arranged between said semitransparent reference surface and said beam expander.

16. An interferometer according to claim 14, wherein said wave plate is arranged between said beam expander and said polarizing beam splitter.

17. An interferometer according to claim 14, wherein said wave plate is arranged within an optical system of said beam expander.

18. An interferometer according to claim 17, wherein said wave plate is arranged at a position closer to said surface to be detected than an inner focal position of said beam expander.

19. An interferometer comprising:

a laser light source for producing a laser light beam of a predetermined wavelength;

an optical system for converting said laser light beam to a substantially parallel light beam having a predetermined beam diameter and directed in a first direction;

a polarizing beam splitter arranged along an optical path of said parallel light beam directed in said first direction wherein first and second polarized light components are related so that vector vibration directions thereof are perpendicular to each other, only said first polarized light component is transmitted in said first direction and only said second polarized light component, directed in a second direction opposite to said first direction, is reflected in a third direction perpendicular to said first direction;

a semitransparent reference surface wherein a part of the first polarized light component of said parallel light beam transmitted through said polarizing beam splitter in said first direction is returned as a reference light in said second direction and the other part of the first polarized light component is transmitted as a measuring light in said first direction;

a surface to be detected arranged to substantially vertically receive irradiation of said measuring light transmitted through said semitransparent reference surface in said first direction to produce a reflection-diffracted light, said reflection-diffracted light being transmitted through said semitransparent reference surface in said second direction;

a wave plate for converting said reference light and said reflection-diffracted light to second polarized components for introduction into said polarizing beam splitter, said second polarized components being reflected by said polarizing beam splitter, combined with each other and directed in said third direction;

an imaging optical system arranged in an optical path directed in said third direction wherein an interference pattern of said second polarized components of said reflection-diffracted light and said reference light is formed on an observation surface at a predetermined position;

a variable aperture stop arranged at a Fourier transform image plane in said imaging optical system with respect to said surface to be detected;

a stop controller for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, controller adjusts an aperture diameter $\phi$ of said variable aperture stop in conformity with a picture element pitch of the CCD camera so as to satisfy the following equation $$\phi = f\lambda \, |\beta_z|/p_c$$

wherein $\beta_z$ is a magnification of said zoom lens system, $\underline{f}$ is the image-side focal length of the imaging optical system, $\lambda$ is the wavelength of the light beam, and $p_c$ is the picture element pitch of the CCD camera.

20. An interferometer comprising:

a laser light source for producing a laser light beam of a predetermined wavelength;

an optical system for converting said laser light beam to a substantially parallel light beam having a predetermined beam diameter and directed in a first direction;

a polarizing beam splitter arranged along an optical path of said parallel light beam directed in said first direction wherein first and second polarized light components are related so that vector vibration directions thereof are perpendicular to each other, only said first polarized light component is transmitted in said first direction and only said second polarized light component, directed in a second direction opposite to said first direction, is reflected in a third direction perpendicular to said first direction;

a semitransparent reference surface wherein a part of the first polarized light component of said parallel light beam transmitted through said polarizing beam splitter in said first direction is returned as a reference light in said second direction and the other part of the first polarized light component is transmitted as a measuring light in said first direction;

a surface to be detected arranged to substantially vertically receive irradiation of said measuring light transmitted through said semitransparent reference surface in said first direction to produce a reflection-diffracted light, said reflection-diffracted light being transmitted through said semitransparent reference surface in said second direction;

a wave plate for converting said reference light and said reflection-diffracted light to second polarized components for introduction into said polarizing beam splitter, said second polarized components being reflected by said polarizing beam splitter, combined with each other and directed in said third direction;

an imaging optical system arranged in an optical path directed in said third direction wherein an interference pattern of said second polarized components of said reflection-diffracted light and said reference light is formed on an observation surface at a predetermined position;

a variable aperture stop arranged at a Fourier transform image plane in said imaging optical system with respect to said surface to be detected;

a stop controller for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop controller adjusts an aperture diameter $\phi$ of said variable aperture stop in accordance with a picture element pitch of the CCD camera so as to satisfy the following equation $\phi \leq f\lambda |\beta_z|/p_c$ wherein $\beta_z$ is a magnification of said zoom lens system, f is the image-side focal length of the imaging optical system, $\lambda$ is the wavelength of the light beam, and $p_c$ is the picture element pitch of the CCD camera.

21. An interferometer comprising:

a light source for producing a light beam of a predetermined wavelength;

a beam splitter for directing the light beam from said light source to a surface to be detected and a reference surface wherein reflected light from said surface to be detected and said reference surface are combined to form combined reflected light on the same optical axis;

an imaging optical system for forming an interference pattern of said combined reflected light;

a detecting optical system for observing said interference pattern formed by said imaging optical system;

a variable aperture stop arranged at a Fourier transform image plane of said surface to be detected within said imaging optical system;

stop control means for varying an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $\phi_y$ of said variable aperture stop in conformity with a picture element pitch of the CCD camera so as to satisfy the following equation $\phi_x = f\lambda |\beta_z|/P_{cx}$; and $\phi_y = f\lambda |\beta_z|/P_{cy}$;

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD camera along a second direction which is perpendicular to said first direction.

22. An interferometer comprising:

a light source for producing a light beam of a predetermined wavelength;

a beam splitter for directing the light beam from said light source to a surface to be detected and a reference surface wherein reflected light from said surface to be detected and said reference surface are combined to form combined reflected light on the same optical axis;

an imaging optical system for forming an interference pattern of said combined reflected light;

a detecting optical system for observing said interference pattern formed by said imaging optical system;

a variable aperture stop arranged at a Fourier transform image plane of said surface to be detected within said imaging optical system;

stop control means for varying an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $\phi_y$ of said variable aperture stop in accordance with a picture element pitch of the CCD camera so as to satisfy the following equations:

$\phi_x \leq f\lambda |\beta_z|/P_{cx}$; and $\phi_y \leq f\lambda |\beta_z|/P_{cy}$;

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD along a second direction which is perpendicular to said first direction.

23. A Twyman-Green interferometer comprising:

a light source for producing light of a predetermined wavelength;

an optical system wherein the light emitted from said light source is converted to a substantially parallel light beam directed in a first direction;

a beam splitter for transmitting said parallel light beam in said first direction and reflecting said parallel light beam in a second direction perpendicular to said first direction thereby separating said parallel light beam into two light beams of a transmitted light and a reflected light of the directions perpendicular to each other;

a surface to be detected for substantially vertically receiving irradiation of said transmitted light to produce a reflection-diffracted light wherein said reflection-diffracted light is reflected by said beam splitter to travel in a third direction which is opposite to said second direction;

a reference surface arranged to substantially vertically receive irradiation of said reflected light to produce a reference reflected light wherein said reference reflected light is transmitted through said beam splitter, combined with said reflection-diffracted light and directed in said third direction;

an imaging optical system arranged in an optical path directed in said third direction to form an interference pattern of said reflection-diffracted light and said reference reflected light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $\phi_y$ of said variable aperture stop in conformity with a picture element pitch of the CCD camera so as to satisfy the following equations:

$$\phi_x = f\lambda \ |\beta_z|/P_{cx}; \text{ and}$$

$$\phi_y = f\lambda \ |\beta_z|/P_{cy};$$

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD camera along a second direction which is perpendicular to said first direction.

24. A Twyman-Green interferometer comprising:

a light source for producing light of a predetermined wavelength;

an optical system wherein the light emitted from said light source is converted to a substantially parallel light beam directed in a first direction;

a beam splitter for transmitting said parallel light beam in said first direction and reflecting said parallel light beam in a second direction perpendicular to said first direction thereby separating said parallel light beam into two light beams of a transmitted light and a reflected light of the directions perpendicular to each other;

a surface to be detected for substantially vertically receiving irradiation of said transmitted light to produce a reflection-diffracted light wherein said reflection-diffracted light is reflected by said beam splitter to travel in a third direction which is opposite to said second direction;

a reference surface arranged to substantially vertically receive irradiation of said reflected light to produce a reference reflected light wherein said reference reflected light is transmitted through said beam splitter, combined with said reflection-diffracted light and directed in said third direction;

an imaging optical system arranged in an optical path directed in said third direction to form an interference pattern of said reflection-diffracted light and said reference reflected light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

said detecting optical system including a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $\phi_y$ of said variable aperture stop in accordance with a picture element pitch of the CCD camera so as to satisfy the following equations:

$$\phi_x \leq f\lambda \ |\beta_z|/P_{cx}; \text{ and}$$

$$\phi_y \leq f\lambda \ |\beta_z|/P_{cy};$$

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD camera along a second direction which is perpendicular to said first direction.

25. A Fizeau interferometer comprising:

a light source for producing light of a predetermined wavelength;

an optical system for converting the light emitted from said light source to a substantially parallel light beam directed in a first direction;

a beam splitter for transmitting said parallel light beam in said first direction and for reflecting an incident light directed in a second direction opposite to said first direction in a third direction perpendicular to said first direction;

a semitransparent reference surface wherein a part of said parallel light beam transmitted through said beam splitter in said first direction is reflected and returned as a reference light in said second direction and the other part of said parallel light beam is transmitted as a measuring light in said first direction, said reference light being reflected by said beam splitter and directed in said third direction;

a surface to be detected arranged so as to substantially vertically receive irradiation of said measuring light transmitted through said semitransparent reference surface in said first direction to produce a reflection-diffracted light, said reflection-diffracted light being transmitted through said semitransparent reference surface in said second direction, reflected by said beam splitter, combined with said reference light and directed in said third direction;

an imaging optical system arranged in an optical path directed in said third direction to form an interference pattern of said reflection-diffracted light and said reference light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control adjusts a first aperture diameter $\phi_x$ and a second aperture diameter $\phi_y$ of said variable aperture stop in conformity with a picture element pitch of the CCD camera so as to satisfy the following equations:

$$\phi_x = f\lambda \ |\beta_z|/P_{cx}; \text{ and}$$

$$\phi_y = f\lambda \ |\beta_z|/P_{cy};$$

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD along a second direction which is perpendicular to said first direction.

26. A Fizeau interferometer comprising:

a light source for producing light of a predetermined wavelength;

an optical system for converting the light emitted from said light source to a substantially parallel light beam directed in a first direction;

a beam splitter for transmitting said parallel light beam in said first direction and for reflecting an incident light directed in a second direction opposite to said first direction in a third direction perpendicular to said first direction;

a semitransparent reference surface wherein a part of said parallel light beam transmitted through said beam splitter in said first direction is reflected and returned as a reference light in said second direction and the other part of said parallel light beam is transmitted as a measuring light in said first direction, said reference light being reflected by said beam splitter and directed in said third direction;

a surface to be detected arranged so as to substantially vertically receive irradiation of said measuring light transmitted through said semitransparent reference surface in said first direction to produce a reflection-diffracted light, said reflection-diffracted light being trasnitted through said semitransparent reference surface in said second direction, reflected by said beam splitter, combined with said reference light and directed in said third direction;

an imaging optical system arranged in an optical path directed in said third direction to form an interference pattern of said reflection-diffracted light and said reference light on an observation surface at a predetermined position;

a variable aperture stop arranged at a Fourier transform image plane in said imaging optical system with respect to said surface to be detected;

a stop control for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control adjusts a first aperture diameter $\phi_x$ and a second aperture diameter $\phi_y$ of said variable aperture stop in accordance with a picture element pitch of the CCD camera so as to satisfy the following equations:

$$\phi_x \leq f\lambda \ |\beta_z|/P_{cx}; \text{ and}$$

$$\phi_y \leq f\lambda \ |\beta_z|/P_{cy};$$

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD camera along a second direction which is perpendicular to said first direction.

27. An interferometer comprising:

a laser light source for producing a laser light beam of a predetermined wavelength;

an optical system for converting said laser light beam to a substantially parallel light beam having a predetermined beam diameter and directed in a first direction;

a polarizing beam splitter arranged along an optical path of said parallel light beam directed in said first direction wherein first and second polarized light components are related so that vector vibration directions thereof are perpendicular to each other, only said first polarized light component is transmitted in said first direction and only said second polarized light component, directed in a second direction opposite to said first direction, is reflected in a third direction perpendicular to said first direction;

a semitransparent reference surface wherein a part of the first polarized light component of said parallel light beam transmitted through said polarizing beam splitter in said first direction is returned as a reference light in said second direction and the other part of the first polarized light component is transmitted as a measuring light in said first direction;

a surface to be detected arranged to substantially vertically receive irradiation of said measuring light transmitted through said semitransparent reference surface in said first direction to produce a reflection-diffracted light, said reflection-diffracted light being transmitted through said semitransparent reference surface in said second direction;

a wave plate for converting said reference light and said reflection-diffracted light to second polarized components for introduction into said polarizing beam splitter, said second polarized components being reflected by said polarizing beam splitter, combined with each other and directed in said third direction;

an imaging optical system arranged in an optical path directed in said third direction wherein an interference pattern of said second polarized components of said reflection-diffracted light and said reference light is formed on an observation surface at a predetermined position;

a variable aperture stop arranged at a Fourier transform image plane in said imaging optical system with respect to said surface to be detected;

a stop controller for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $100_y$ of said variable aperture stop in conformity with a picture element pitch of the CCD camera so as to satisfy the following equation:

$\phi_x = f\lambda \ |\beta_z|/P_{cx}$; and $\phi_y = f\lambda \ |\beta_z|/P_{cy}$;

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD along a second direction which is perpendicular to said first direction.

28. An interferometer comprising:

a laser light source for producing a laser light beam of a predetermined wavelength;

an optical system for converting said laser light beam to a substantially parallel light beam having a predetermined beam diameter and directed in a first direction;

a polarizing beam splitter arranged along an optical path of said parallel light beam directed in said first direction wherein first and second polarized light components are related so that vector vibration directions thereof are perpendicular to each other, only said first polarized light component is transmitted in said first direction and only said second polarized light component, directed in a second direction opposite to said first direction, is reflected in a third direction perpendicular to said first direction;

a semitransparent reference surface wherein a part of the first polarized light component of said parallel light beam transmitted through said polarizing beam splitter in said first direction is returned as a reference light in said second direction and the other part of the first polarized light component is transmitted as a measuring light in said first direction;

a surface to be detected arranged to substantially vertically receive irradiation of said measuring light transmitted through said semitransparent reference surface in said first direction to produce a reflection-diffracted light, said reflection-diffracted light being transmitted through said semitransparent reference surface in said second direction;

a wave plate for converting said reference light and said reflection-diffracted light to second polarized components for introduction into said polarizing beam splitter, said second polarized components being reflected by said polarizing beam splitter, combined with each other and directed in said third direction;

an imaging optical system arranged in an optical path directed in said third direction wherein an interference pattern of said second polarized components of said reflection-diffracted light and said reference light is formed on an observation surface at a predetermined position;

a variable aperture stop arranged at a Fourier transform image plane in said imaging optical system with respect to said surface to be detected;

a stop controller for adjusting an aperture diameter of said variable aperture stop to adjust a spatial resolution of said interferometer in order to detect said surface with a desired value of spatial resolution;

a zoom lens system for varying a magnification of said interference pattern formed by said imaging optical system; and a CCD camera for picking up said interference pattern varied in magnification by said zoom lens system, wherein said stop control means adjusts a first aperture diameter $\phi_x$ and a second aperture diameter $\phi_y$ of said variable aperture stop in accorandance with a picture element pitch of the CCD camera so as to satisfy the following equations:

$\phi_x \leq f\lambda \ |\beta_z|/P_{cx}$; and $\phi_y \leq f\lambda \ |\beta_z|/P_{cy}$;

wherein $\beta_z$ is a magnification of said zoom lens system, f is an image-side focal length of the imaging optical system, $\lambda$ is the predetermined wavelength of the light beam, $P_{cx}$ is a first picture element pitch of the CCD camera along a first direction, and $P_{cy}$ is a second picture element pitch of the CCD along a second direction which is perpendicular to said first direction.

* * * * *